US012434258B2

(12) United States Patent
Wang et al.

(10) Patent No.: US 12,434,258 B2
(45) Date of Patent: Oct. 7, 2025

(54) SYSTEM FOR HIGH THROUGHPUT PRINTING OF PRESSURE SENSITIVE ADHESIVE

(71) Applicant: GE PRECISION HEALTHCARE LLC, Wauwatosa, WI (US)

(72) Inventors: Yanju Wang, Hartland, WI (US); Christopher Michael Gabel, Waukesha, WI (US); Stephen Michael Crynock, Fredonia, WI (US); Todd Arthur Burke, Pewaukee, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 321 days.

(21) Appl. No.: 17/475,644

(22) Filed: Sep. 15, 2021

(65) Prior Publication Data

US 2023/0081069 A1 Mar. 16, 2023

(51) Int. Cl.

| | |
|---|---|
| ***B05C 1/02*** | (2006.01) |
| ***B05C 1/06*** | (2006.01) |
| ***B05D 1/28*** | (2006.01) |
| ***B05D 5/10*** | (2006.01) |
| ***B05D 7/24*** | (2006.01) |

(52) U.S. Cl.

CPC ................ *B05C 1/027* (2013.01); *B05C 1/06* (2013.01); *B05D 1/28* (2013.01); *B05D 5/10* (2013.01); *B05D 7/24* (2013.01); *B05D 2201/02* (2013.01)

(58) Field of Classification Search

CPC ....... B05C 1/06; B05C 1/0886; B05C 1/0873; B05C 1/0895

See application file for complete search history.

(56) References Cited

U.S. PATENT DOCUMENTS

| | | | | |
|---|---|---|---|---|
| 6,048,921 | A * | 4/2000 | White | C23C 22/73 427/407.1 |
| 9,549,654 | B1 | 1/2017 | Williams | |
| 10,610,886 | B2 * | 4/2020 | Jing | B05D 1/28 |
| 11,707,759 | B2 * | 7/2023 | Naito | B05C 1/0804 118/708 |
| 2002/0081386 | A1 * | 6/2002 | Yoshida | B05B 12/1463 118/503 |

(Continued)

FOREIGN PATENT DOCUMENTS

| | | |
|---|---|---|
| CN | 102198438 B | 9/2011 |
| CN | 206464149 U | 9/2017 |

OTHER PUBLICATIONS

"Rigid", 2025, Merriam-Webster, Incorporated.; https://www.merriam-webster.com/dictionary/rigid; p. 1. (Year: 2025).*

(Continued)

*Primary Examiner* — Karl Kurple

(57) ABSTRACT

A system for printing PSA on a substrate includes a rigid support structure. The system also includes a plurality of dispensing heads disposed within the rigid support structure and configured to deposit PSA solution on the substrate in response to applied pressure. Each dispensing head of the plurality of dispensing heads includes a support structure and a wicking structure disposed within the support structure and configured to hold the PSA solution, wherein the wicking structure is configured to deposit the PSA solution in a desired shape on the substrate upon contact with the substrate.

13 Claims, 8 Drawing Sheets

(56) References Cited

U.S. PATENT DOCUMENTS

| | | | | |
|---|---|---|---|---|
| 2007/0134051 | A1* | 6/2007 | Todd | A01M 21/043 401/266 |
| 2014/0272129 | A1* | 9/2014 | Balaji | B05C 5/0216 118/256 |
| 2016/0339468 | A1* | 11/2016 | Jing | H10K 50/844 |
| 2019/0015864 | A1* | 1/2019 | Qu | H10K 50/8426 |
| 2019/0099776 | A1* | 4/2019 | Hackenberg | F16K 21/185 |
| 2019/0153248 | A1* | 5/2019 | Martinez de Leon | B41M 5/03 |
| 2021/0387222 | A1* | 12/2021 | Naito | B05C 1/0873 |

OTHER PUBLICATIONS

CN 206464149U English Abstract; Espacenet search results May 11, 2023; 1 page.
EP application 22193956.4 filed Sep. 5, 2022—extended Search Report issued Feb. 17, 2023; 9 pages.

* cited by examiner

SYSTEM FOR HIGH THROUGHPUT PRINTING OF PRESSURE SENSITIVE ADHESIVE

BACKGROUND

The subject matter disclosed herein relates to systems and methods for high throughput printing of pressure sensitive adhesive.

Pressure sensitive adhesives (PSA) are adhesives that can be adhered to a surface and yet can be removed from the surface without transferring more than trace quantities of adhesive to the surface, and can be readhered to the same or another surface because the adhesive retains some or all of its tack and adhesive strength. PSA has a variety of uses. For example, various articles in the medical industry may utilize PSA (e.g., medical sensors, printed circuits, etc.).

PSA may be produced (e.g., printed) on substrates via screen printing techniques. However, current screen printing techniques for PSA are difficult to implement and present a number of challenges. For example, the solvent utilized in the PSA presents environmental health and safety (EHS) concerns. The solvent has extremely strong odors that may cause operators nausea and headaches. In addition, the solvent changes its behavior (e.g., becomes thicker) during the printing process due to solvent evaporation affecting the printing quality. Solvent evaporation also causes PSA to build up on the screen which leads to scrapping of material and having to clean the screen often. Further, the cleaning of the stencil utilized in printing requires the same solvents, thus, raising the same EHS concerns. Even further, after screen printing, air bubbles may form due to these materials which may require letting the printing parts sit to reduce air bubbles. Therefore, there is a need for an alternative method to apply this material that reduces EHS concerns and scrapping of material while improving production continuity.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the invention may encompass a variety of forms that may be similar to or different from the embodiments set forth below.

In one embodiment, a system for printing PSA on a substrate is provided. The system includes a rigid support structure. The system also includes a plurality of dispensing heads disposed within the rigid support structure and configured to deposit PSA solution on the substrate in response to applied pressure. Each dispensing head of the plurality of dispensing heads includes a support structure and a wicking structure disposed within the support structure and configured to hold the PSA solution in place, wherein the wicking structure is configured to deposit the PSA solution in a desired shape on the substrate upon contact with the substrate.

In another embodiment, a method for printing PSA on a substrate is provided. The method includes flowing a PSA solution into a plurality of dispensing heads disposed within a rigid support structure, wherein each dispensing head of the plurality of dispensing heads is configured to deposit the PSA solution on the substrate in response to applied pressure and each dispensing head includes a support structure and a wicking structure disposed within the support structure to hold the PSA solution. The method also includes positioning the rigid support structure on the substrate with sufficient pressure to cause the PSA solution to be deposited in a desired shape on the substrate from each dispensing head upon contact with the substrate.

In a further embodiment, a system for printing PSA on a substrate is provided. The system includes a rigid support structure having a handle. The system also includes a robotic system coupled to the rigid support structure via the handle, wherein the robotic system is configured to move the rigid support structure to a desired position for depositing PSA solution on the substrate and to apply pressure to the rigid support structure for depositing the PSA solution. The system further includes a plurality of dispensing heads disposed within the rigid support structure and configured to deposit the PSA solution on the substrate in response to applied pressure, wherein each dispensing head of the plurality of dispensing heads includes a feed conduit. The system even further includes a programmed feeding system coupled to a respective feed conduit of each dispensing head, wherein the programmed feeding system is configured to provide the PSA solution to each respective feed conduit for deposition of the PSA solution.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
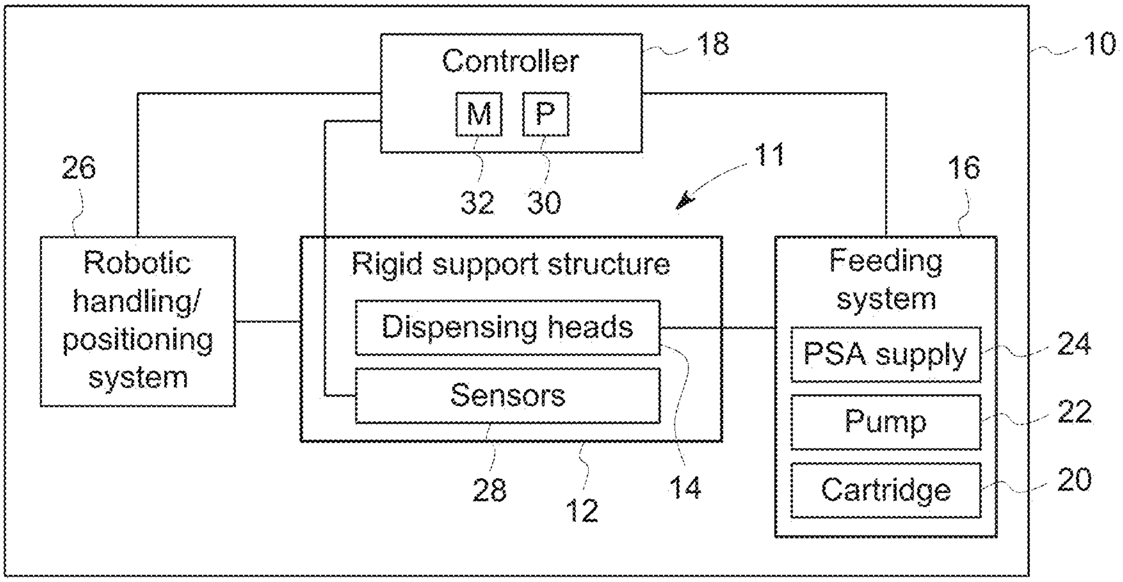
FIG. 1 is a schematic diagram of a dispensing system for printing PSA on a substrate, in accordance with certain aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present disclosure provides systems and methods for dispensing PSA (e.g., liquid PSA) onto a flat substrate. In particular, a dispensing system includes a dispensing tool including a rigid support structure having a plurality of dispensing heads that will dispense or deposit PSA solution onto to flat substrate when pressure is applied. A programmable closed feeding system is coupled to the dispensing heads. In addition, a robotic handling/positioning system is coupled to the rigid support structure that controls movement/positioning of the rigid support structure and associated dispensing heads during the printing of the PSA onto the substrate. The dispensing system is easily automated via the programmable closed feeding system and the robotic handling/positioning system to enable large scale or high throughput production. Each dispensing head includes a support structure and a wicking structure (e.g., porous membrane or sponge) disposed within the support structure. The wicking structure enables the holding of the PSA solution in place without dripping when uncapped. When not being utilized, the dispensing heads may be capped to keep solvent from evaporating. The wicking structure enables the PSA to be deposited in desired shape upon instantaneous contact with the substrate (e.g., via a stamping action) without the need of PSA solution being continuously provided to the wicking structure for dispensing the PSA. The dispensing system functions similar to a screen printing system and a needle dispensing system without their associated drawbacks (e.g., cost, maintenance, throughput level, etc.). The dispensing system as configured minimizes solvent evaporation (as well as EHS concerns) and material consumption or scrapping. In addition, the dispensing system reduces production cycle time.

FIG. 1 is a schematic diagram of a dispensing system 10 for printing PSA on a substrate. The dispensing system 10 functions similar to a screen printing system but at lower cost with less maintenance. In addition, the dispensing system 10 is easier to clean. The dispensing system 10 functions similar to a needle dispensing system as well but with improved throughput. In particular, the dispensing system 10 stamps the PSA onto a flat substrate (e.g. polyester, polycarbonate, polyolefin, polystyrene, polymethyl methacrylate, poly paper, polyamide, polyimide, polysulfone, etc.) in a high throughput manner.

The dispensing system 10 includes a dispensing tool 11 that includes a rigid support structure 12 (defined with one or more walls). The rigid support structure 12 includes a plurality of dispensing heads 14 disposed within the rigid support structure 12 for dispensing or depositing PSA solution onto the substrate in response to applied pressure. The number of dispensing heads 14 within the rigid support structure 12 could range from 2 to 100 or more dispensing heads 14. In certain embodiments, the dispensing system 10 may include more than one rigid support structure 12 with respective dispensing heads 14.

As described in greater detail below, each dispensing head 14 includes a support structure (e.g., defined by walls of the rigid support structure and/or other walls) and a wicking structure disposed within the support structure. The wicking structure may be a porous membrane or sponge. The wicking structure holds the PSA solution in place without dripping when the dispensing head 14 is uncapped. In particular, the wicking structure holds the PSA solution in place (e.g., due to the viscosity of the PSA solution) unless pressure is applied. The wicking structure may include controlled pore sizes to control liquid flow. In certain embodiments, an end of the dispensing head 14 adjacent the wicking structure may be open to enable direct contact between the wicking structure and substrate for dispensing the PSA solution onto the substrate. The wicking structure enables the PSA to be deposited in desired shape upon instantaneous contact with the substrate (e.g., via a stamping action) without the need of PSA solution being continuously provided to the wicking structure for dispensing the PSA. In certain embodiments, the end of the dispensing head 14 adjacent the wicking layer may be covered with a porous layer including pores or holes for dispensing the PSA solution onto the substrate in a controlled manner with a controlled volume (e.g., similar to needle dispensing) in a desired pattern. In certain embodiments, the end of the dispensing head 14 adjacent the wicking structure, a portion of a porous layer adjacent the wicking layer, and/or the wicking structure is similar in shape to the shape of the printed PSA.

In certain embodiments, when the dispensing heads 14 are not being utilized to print PSA, each end of the dispensing head 14 adjacent the wicking structure is capped with a cap or cover to keep the PSA solution from drying up. The capping of the dispensing heads reduces solvent loss to due solvent evaporation and, thus, also reduces EHS concerns.

In certain embodiments, each dispensing head 14 includes a feed conduit for receiving PSA solution within the dispensing head 14 (which then flows to the wicking structure). The dispensing system 10 includes a feeding system 16 (e.g., closed feeding system) coupled to each respective feed conduit of the dispensing heads 14. The feeding system 16 is programmable. Indeed, the feeding system 16 is coupled to a controller 18 that controls the operation of the feeding system 16 and the flow of the PSA solution to the dispensing heads 14. In certain embodiments, the feeding system 16 may provide PSA solution to the dispensing heads 14 during operation. The feeding system 16 includes one or more cartridges 20 that are coupled to respective feed conduits of the dispensing heads 14. The feeding system 16 also includes a pump 22 (e.g., motor driven pump) that facilitates the flow of PSA solution from a PSA supply or reservoir 24 to the cartridges 20 and then to the dispensing heads 14 (via the feed conduits). The closed feeding system 16 reduces solvent loss (e.g., due to solvent evaporation) compared to an open system utilized in screen printing (which increases a viscosity of the PSA solution leading to production consistency issues) and, thus, also reduces EHS concerns. The closed feeding system 16 also reduces material consumption (as well as the material lost due to scrapping) compared to screen printing. The configuration of the dispensing system 10 (including the closed feeding system 16) minimizes air bubbles (e.g., compared to screen printing) and, thus, avoids having to let the dispensing sit resulting in a reduced production cycle time (e.g., compared to screen printing).

In certain embodiments, the rigid support structure 12 includes a handle enabling the movement or positioning (e.g., via manual or robotic handling) of the rigid support structure 12 for printing PSA on the substrate. As depicted in FIG. 1, the dispensing system 10 includes a robotic handling/positioning system 26 for handling or moving the rigid support structure 12 to a desired position for dispensing of the PSA solution onto the substrate from the dispensing heads 14. The robotic handling/positioning system 26 also presses (e.g., stamps) the rigid support structure 12 on the substrate with sufficient pressure for dispensing or depositing the PSA solution from the dispensing heads 14. The robotic handling/positioning system 26 is coupled to the controller 18. The controller 18 controls the operation of the robotic handling/positioning system 26 and, thus, the handling/positioning of the rigid support structure 12 having the dispensing heads 14.

In certain embodiments, the rigid support structure 14 includes one or more pressure sensors 28 (e.g., strain gauges, MEMS based sensors, variable capacitance pressure sensors, etc.) disposed within. The number of pressure sensors 28 may be 1, 2, 3, 4, or more. The one or more sensors 28 are coupled to the controller 18. The sensors 28 provide feedback to the controller 18 regarding the pressure applied between the rigid support structure 14 and the substrate. Based on the feedback from the sensors 28, the controller 18 monitors and controls the pressure applied between the rigid support structure 14 and the substrate.

The controller 18 includes a processor 30 and a memory 32 (e.g., a non-transitory computer-readable medium/memory circuitry) communicatively coupled to the processor 30, storing one or more sets of instructions (e.g., processor-executable instructions) implemented to perform operations related to the dispensing system 10 (e.g., operations of the feeding system 16, the robotic handling/positioning system 26, etc.). More specifically, the memory 32 may include volatile memory, such as random-access memory (RAM), and/or non-volatile memory, such as read-only memory (ROM), optical drives, hard disc drives, or solid-state drives. Additionally, the processor 30 may include one or more application specific integrated circuits (ASICs), one or more field programmable gate arrays (FPGAs), one or more general purpose processors, or any combination thereof. Furthermore, the term "processor" is not limited to just those integrated circuits referred to in the art as processors, but broadly refers to computers, processors, microcontrollers, microcomputers, programmable logic controllers, application specific integrated circuits, and other programmable circuits. The dispensing system 10 may include a single controller to control the various systems of the dispensing system 10. In certain embodiments, each system (e.g., the feeding system 16, the robotic handling/positioning system 26, etc.) of the dispensing system 10 may include a separate controller. The dispensing system 10 is easily automated through the programmable feeding system 16 and the robotic handling/positioning system 26 to enable the large scale production/printing of the PSA on the substrate.

Figure 2:
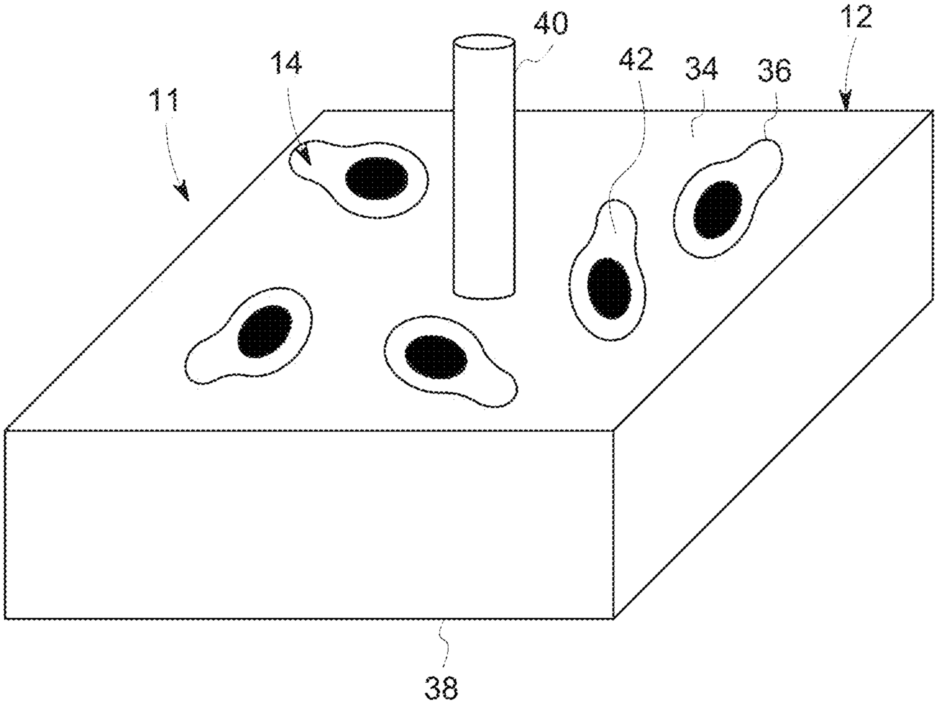
FIG. 2 is a perspective view of a dispensing tool of the dispensing system in FIG. 1, in accordance with certain aspects of the present disclosure.

FIG. 2 is a perspective view of the dispensing tool 11 of the dispensing system 10 in FIG. 1. The dispensing tool 11 includes the rigid support structure 12 defined by one or more walls 34. The support structure 12 is rigid in that the structure 12 maintains its shape during the printing or stamping of PSA on the substrate. As depicted, the rigid support structure 12 includes a rectilinear shape. In certain embodiments, the shape of the rigid support structure 12 may vary. The dispensing tool 11 includes the plurality of dispensing heads 14 disposed within the rigid support structure 12. The dispensing heads 14 dispense or deposit PSA solution onto the substrate in response to applied pressure. The number of dispensing heads 14 within the rigid support structure 12 could range from 2 to 100 or more dispensing heads 14. The dispensing heads 14 extend from a top surface 36 to a bottom surface 38 of the rigid support structure 12. The bottom surface 38 of the rigid support structure 12 directly interfaces with the substrate during the stamping or printing process.

As depicted, the dispensing tool 11 includes a handle 40 coupled to the top surface 36 of the rigid support structure 12. The handle 40 enables the movement or positioning (e.g., via manual or robotic handling) of the dispensing tool 11 (and, thus, the rigid support structure 12) for printing PSA on the substrate. A robotic handling/positioning system (e.g., robotic handling/positioning system 26 in FIG. 1) may be coupled to the dispensing tool via the handle 40 to enable handling or moving the dispensing tool 11 to a desired position for dispensing of the PSA solution onto the substrate from the dispensing heads 14. In certain embodiments, the robotic handling/position system may be coupled individual lines coupled to respective dispensing heads 14. The robotic handling/positioning system also presses (e.g., stamps) the dispensing tool 11 on the substrate with sufficient pressure for dispensing or depositing the PSA solution from the dispensing heads 14. The robotic handling/positioning system may be coupled to a controller. The controller may control the operation of the robotic handling/positioning system and, thus, the handling/positioning of the dispensing tool 11.

Figure 3:
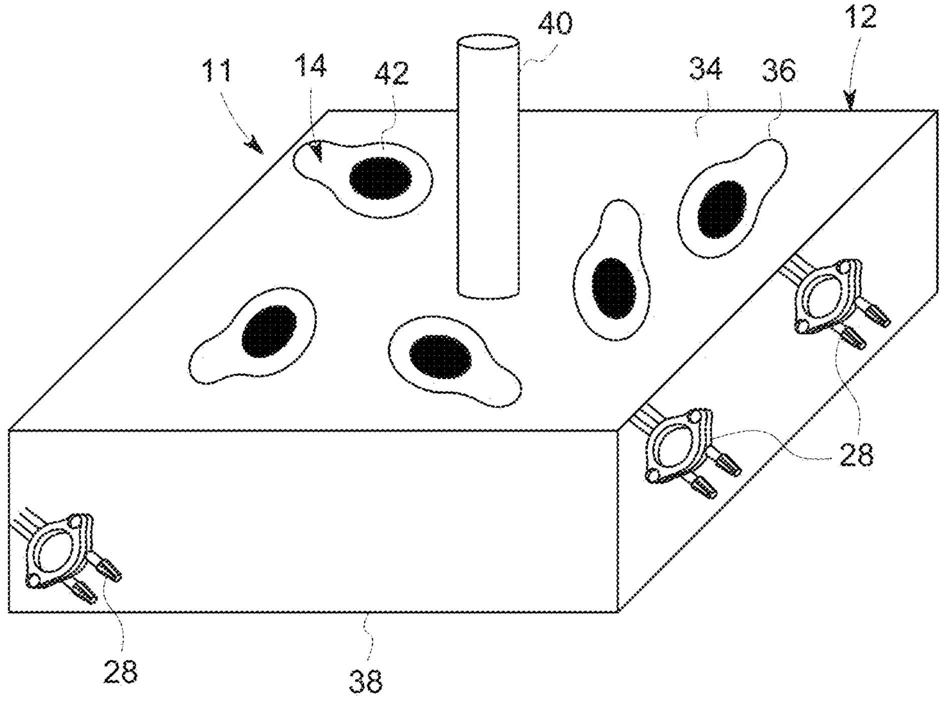
FIG. 3 is a perspective view of a dispensing tool of the dispensing system in FIG. 1 (e.g., having pressure sensors), in accordance with certain aspects of the present disclosure.

FIG. 3 is a perspective view of the dispensing tool 11 of the dispensing system 10 in FIG. 1. The dispensing tool 11 in FIG. 3 is similar to the dispensing tool 11 in FIG. 2. In addition, as depicted in FIG. 3, the dispensing tool 11 includes a plurality of pressure sensors 28 (e.g., strain gauges, MEMS based sensors, variable capacitance pressure sensors, etc.) disposed within the rigid support structure 12. The number of pressure sensors 28 may be 1, 2, 3, 4, or more. The pressure sensors 28 may be coupled to a controller. The sensors 28 provide feedback to the controller regarding the pressure applied between the rigid support structure 14 of the dispensing tool 11 and the substrate. Based on the feedback from the sensors 28, the controller monitors and controls the pressure applied between the rigid support structure 14 and the substrate.

Figure 4:
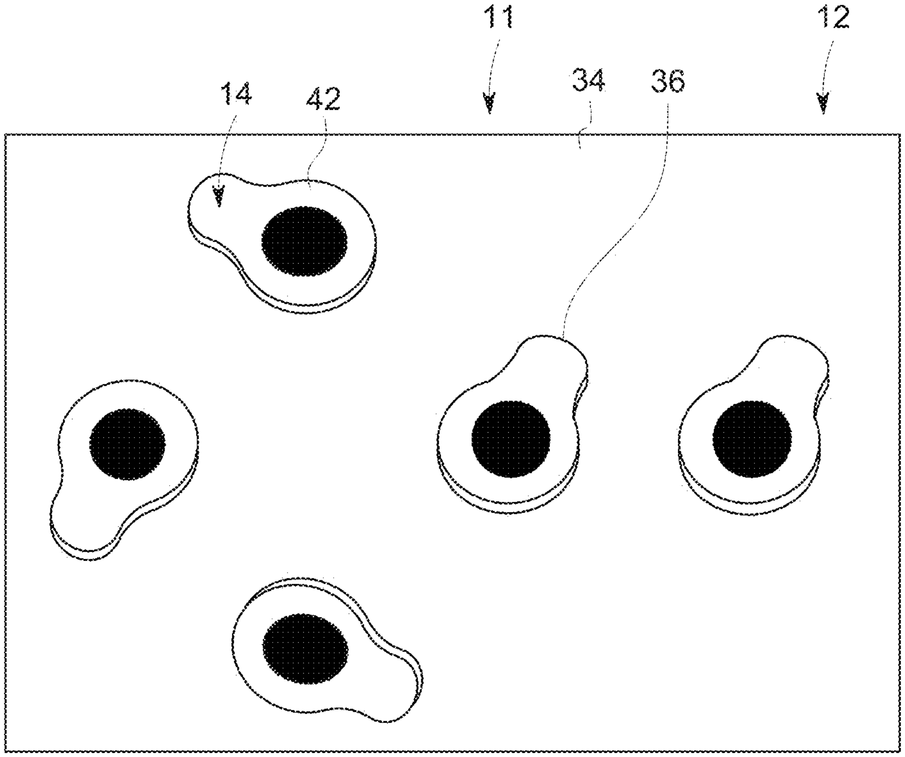
FIG. 4 is a top view of a dispensing tool of the dispensing system in FIG. 1, in accordance with certain aspects of the disclosure.

FIG. 4 is a top view of the dispensing tool 11 of the dispensing system 10 in FIG. 1. The dispensing tool 11 in FIG. 4 is similar to the dispensing tool 11 in FIG. 2. Both the number and arrangement of the dispensing heads 14 may vary between different dispensing tools 11. The arrangement of the dispensing heads 14 within the rigid support structure 12 in FIG. 4 varies from the arrangement in FIGS. 2 and 3. As depicted in FIGS. 2-4, an end 42 of the dispensing head 14 may be similar in shape to the shape of the printed PSA.

Figure 5:
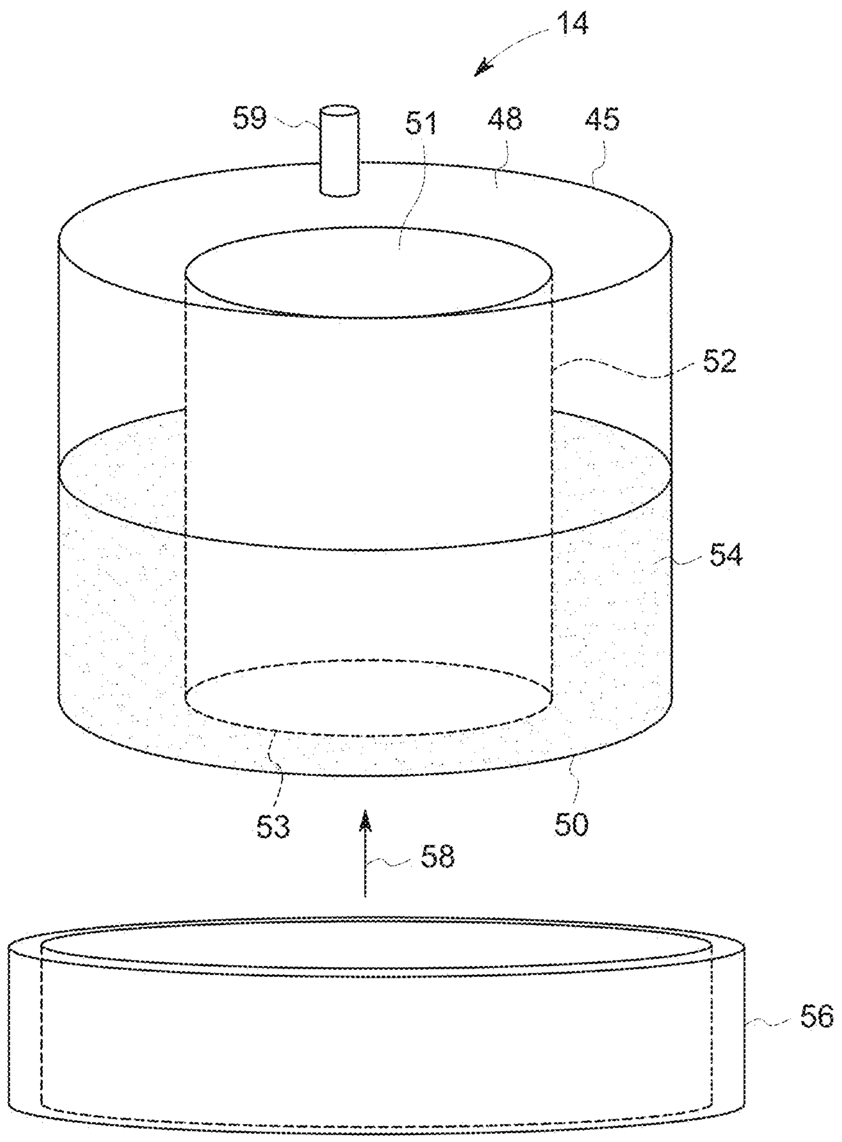
FIG. 5 is a perspective view of a dispensing head (e.g., bottom end facing down) having a cover, in accordance with certain aspects of the disclosure.
Figure 6:
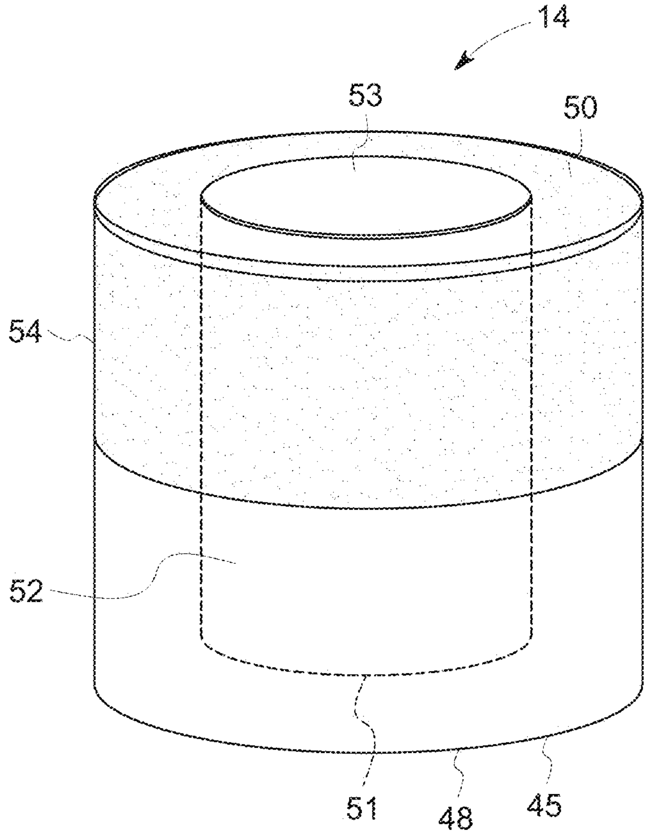
FIG. 6 is a perspective view of the dispensing head in FIG. 5 (bottom end facing up), in accordance with certain aspects of the present disclosure.

FIGS. 5 and 6 are perspective views of the dispensing head 14. The dispensing head 14 includes a shape 45 defined by one or walls (e.g., internal walls) of the rigid support structure 12. As depicted, the shape 45 has a cylindrical shape. In other embodiments, the shape 45 may be different. The dispensing head 14 includes a first end 48 (e.g., top end) and a second end 50 (e.g., bottom end). The second end 50 directly interfaces with the substrate during PSA printing. The dispensing head 14 also includes a central support structure 52 disposed within. As depicted, the central support structure 52 is a hollow cylinder having ends 51, 53. The end 51 is closed and the end 53 is open. In certain embodiments, the end 53 may be closed. As depicted, the central support structure 52 extends toward (but not all the way to) the first end 48. The central support structure 52 extends all the way to the second end 50. The dispensing head 14 further includes a wicking structure 54. The wicking structure 54 is disposed about the central support structure 52 to secure the wicking structure 54 within the dispensing head 14. The wicking structure 54 is disposed adjacent the second end 50. The wicking structure 54 may be a porous membrane or sponge. The wicking structure 54 holds the PSA solution in place without dripping when the dispensing head 14 is uncapped. In particular, the wicking structure 54 holds the PSA solution in place (e.g., due to the viscosity of the PSA solution) unless pressure is applied. The wicking structure 54 may include controlled pore sizes to control liquid flow. As depicted, the second end 50 of the dispensing head 14 adjacent the wicking structure 54 is open to enable direct contact between the wicking structure 54 and substrate for dispensing the PSA solution onto the substrate. The wicking structure 54 enables the PSA to be deposited in desired shape upon instantaneous contact with the substrate (e.g., via a stamping action) without the need of PSA solution being continuously provided to the wicking structure for dispensing the PSA. In certain embodiments, the second end 50 of the dispensing head 14 adjacent the wicking layer may be covered with a porous layer including pores or holes for dispensing the PSA solution onto the substrate in a controlled manner with a controlled volume (e.g., similar to needle dispensing) in a desired pattern. In certain embodiments, the second end 50 of the dispensing head 14 adjacent the wicking structure 54, a portion of a porous layer adjacent the wicking layer, and/or the wicking structure 54 is similar in shape to the shape of the printed PSA. The first end 48 of the dispensing head 14 is closed.

When the dispensing head 14 is not being utilized to print PSA, the second end 50 of the dispensing head 14 adjacent the wicking structure 54 is capped with a cap or cover 56 to keep the PSA solution from drying up as indicated by arrow 58. The capping of the dispensing head 14 reduces solvent loss to due solvent evaporation and, thus, also reduces EHS concerns.

The dispensing head 14 also includes a feed conduit 59 for receiving PSA solution within the dispensing head 14 (which then flows to the wicking structure 54). A feeding system (e.g., closed feeding system 16 in FIG. 1) may be coupled to the feed conduit 59 of the dispensing head 14 to provide the PSA solution.

Figure 7:
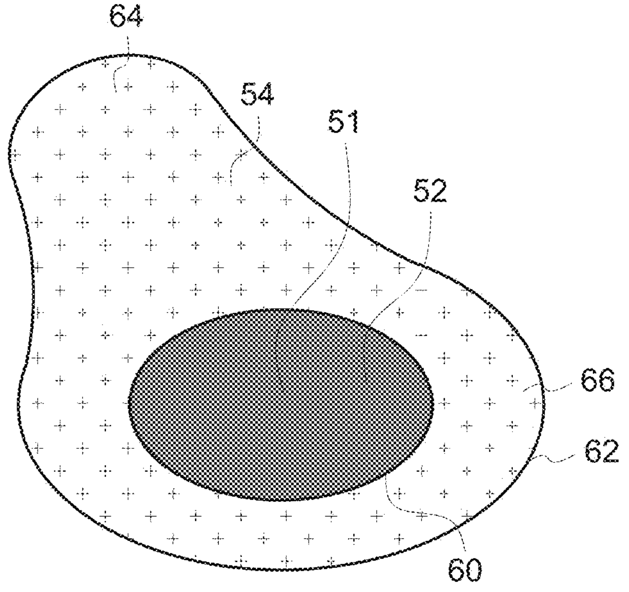
FIG. 7 is a perspective view of a bottom of a wicking structure of a dispensing head, in accordance with certain aspects of the present disclosure.

FIG. 7 is a perspective view of a bottom of the wicking structure 54 of a dispensing head. The wicking structure 54 may be a porous membrane or sponge. The wicking structure 54 holds the PSA solution in place without dripping when the dispensing head is uncapped. In particular, the wicking structure 54 holds the PSA solution in place (e.g., due to the viscosity of the PSA solution) unless pressure is applied. The wicking structure 54 may include controlled pore sizes to control liquid flow. As depicted, a first O-ring 60 is disposed between the wicking structure 54 and the central support structure 52. Also, a second O-ring 62 is disposed about the wicking structure 54 that is configured to be disposed between walls (e.g., internal walls of the rigid support structure) defining the dispensing head 14 and the wicking structure 54. As depicted in FIGS. 5 and 6, the cross-sectional shape of the wicking structure 54 is annular. In FIG. 7, the cross-sectional shape of the wicking structure 54 includes a protrusion 64 extending away from an annular portion 66. The cross-sectional shape of the wicking structure 54 may be similar in shape to the shape of the printed PSA.

FIGS. 8A-8G are side cross-sectional views of different dispensing heads 14. Each dispensing head 14 in FIGS. 8A-8G may be defined relative to a longitudinal axis 68 (shown in FIG. 8A extending from between the ends 48, 50) by an axial direction 70, a radial direction 72, or a circumferential direction 74. In addition, each dispensing head 14 may include a length 76 in the radial direction 72 and a length 78 in the axial direction 70. FIGS. 8A-8G illustrate dispensing heads 80, 82, 84, 86, 88, 90, and 92, respectively. The different dispensing heads 14 may vary in the length 76 or in the length 78 or in both the lengths 76, 78. As depicted, a support structure 44 of each dispensing head 14 includes a top wall 94 (at the end 48) and a wall 96 (e.g., side wall extending between the ends 48 and 50). The wall 96 may be a portion of the rigid support structure. In certain embodiments, depending on the shape of the dispensing head 14, multiple walls 96 may extend between the ends 48 and 50 of the dispensing head 14. Some of the dispensing heads 14 (e.g., dispensing heads 80, 82, 84, and 90) include a bottom wall (at the end 50) that includes an opening for the central support structure 52 and the wicking structure 54 disposed about the wicking structure 54. The ends 50 of the dispensing heads 80, 82, 84, and 86 are open to directly enable a portion of the wicking structure 54 at the end 50 to directly interface with the substrate to dispense or deposit the PSA solution during printing (e.g., stamping) upon application of pressure. Some of the dispensing heads 80, 86 include portions of the wicking structure 54 extend in the axial direction 70 past the end 50 of the support structure 44.

Figure 8A:
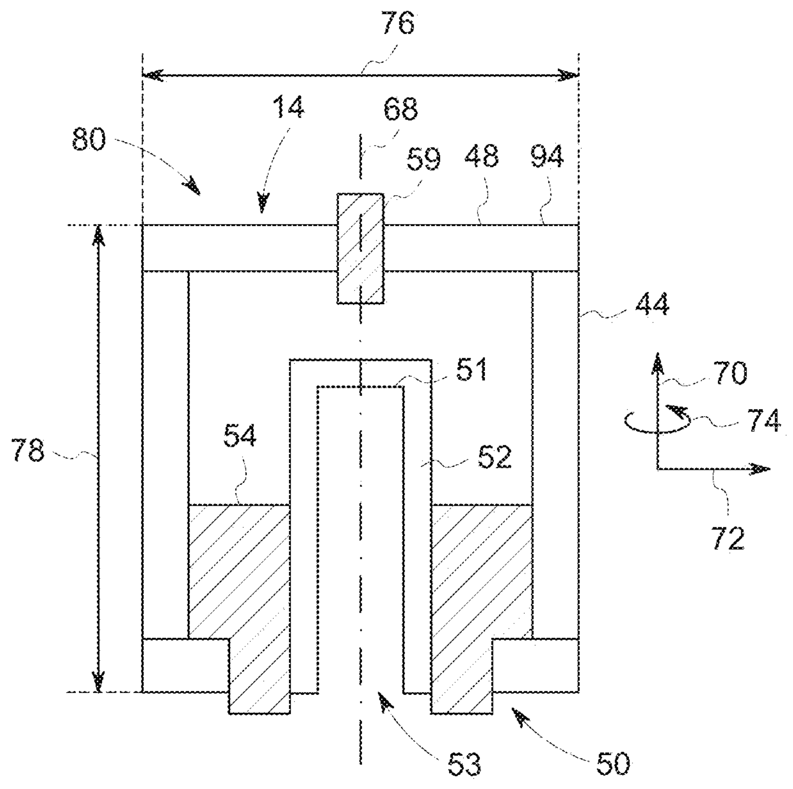
FIGS. 8A-8G are side cross-sectional views of different dispensing heads, in accordance with certain aspects of the present disclosure.
Figure 8B:
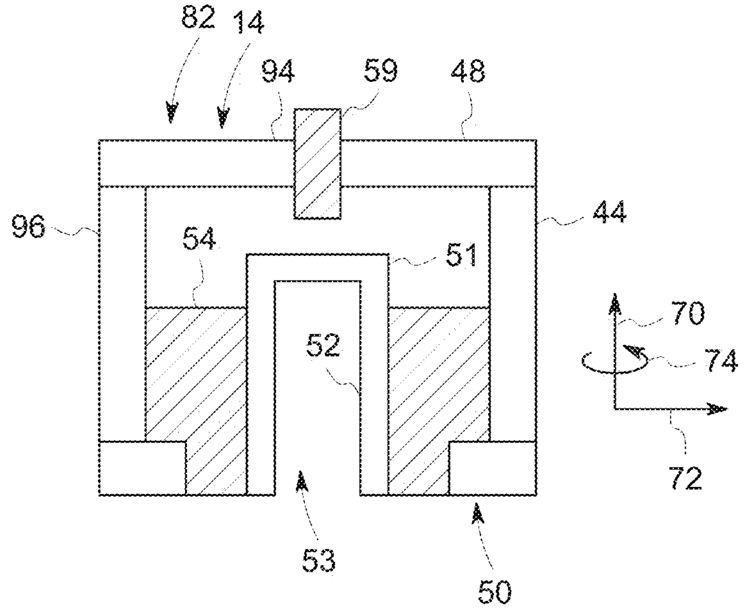
Figure 8C:
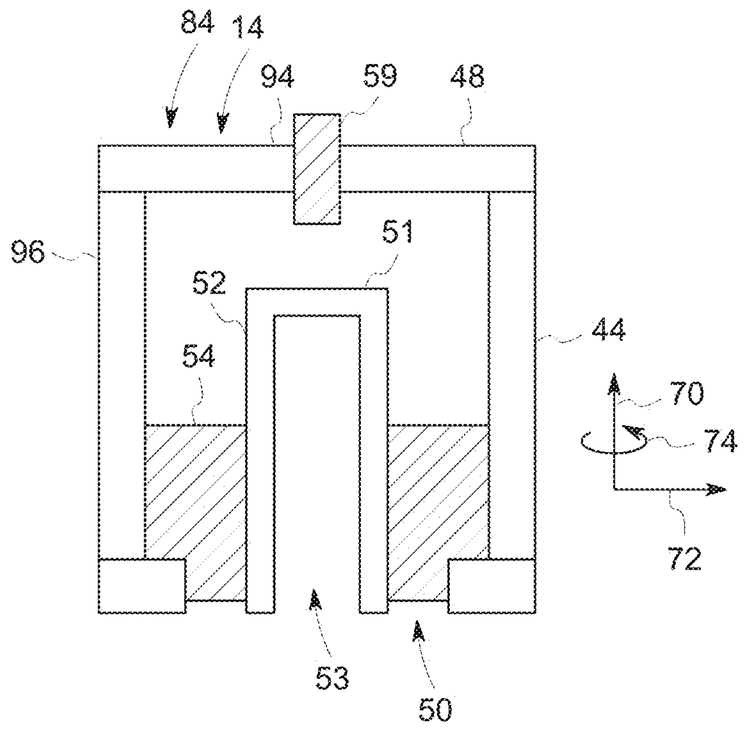
Figure 8D:
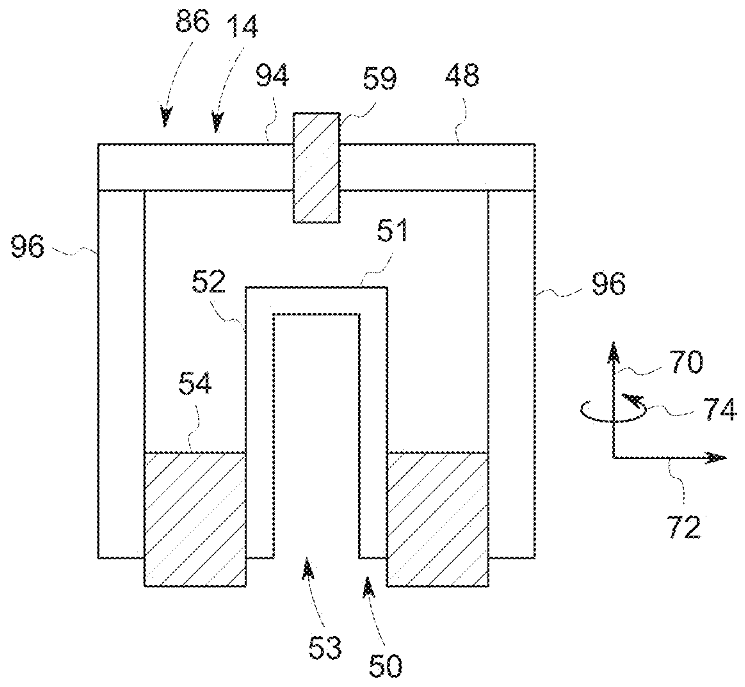
Figure 8E:
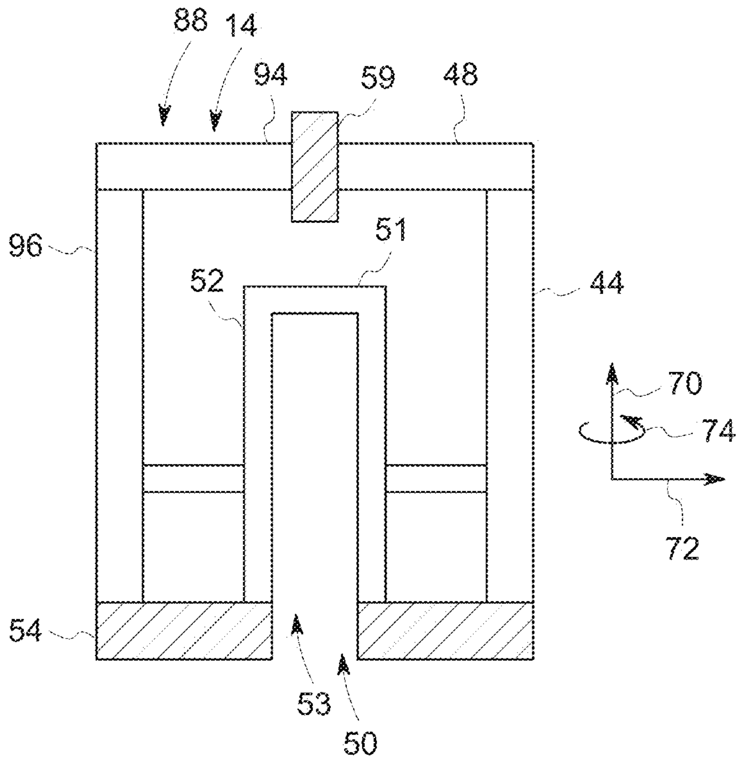
Figure 8F:
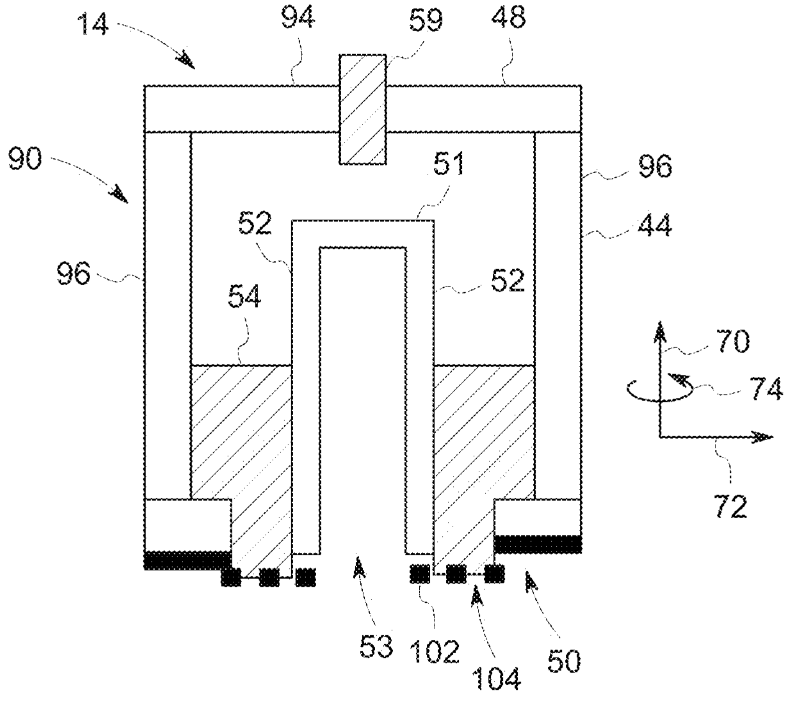
Figure 8G:
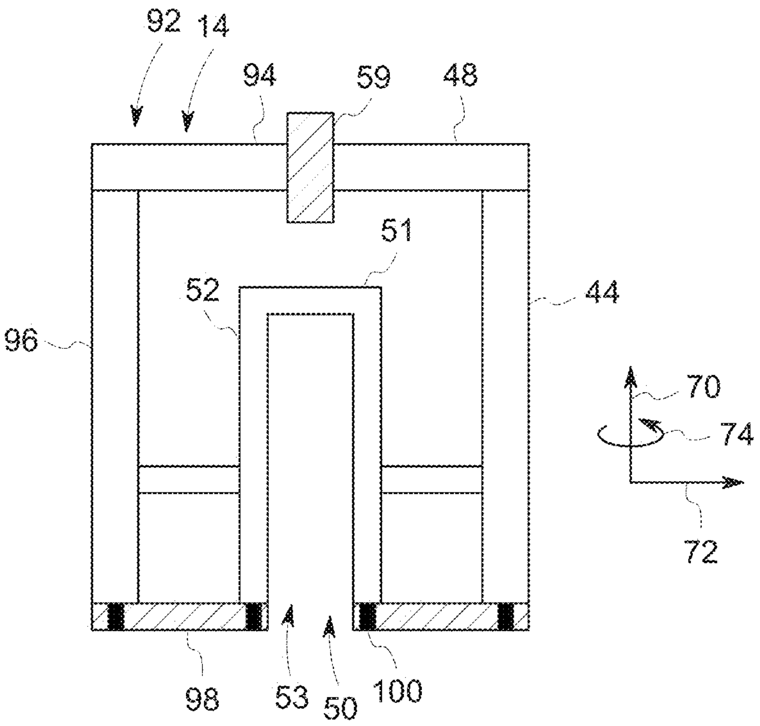

Dispensing head 88 in FIG. 8E does not have the wicking structure 54 disposed within the support structure 44. Instead, the dispensing head 88 has the wicking structure 54 disposed on the end 50 of the support structure 44. As an alternative to wicking structure 54, a porous layer 98 (depicted in FIG. 8G) may be disposed on the end 50 of the support structure 44 on dispensing head 92. The porous layer 98 includes pores or holes for dispensing the PSA solution onto the substrate in a controlled manner with a controlled volume (e.g., similar to needle dispensing) in a desired pattern. The porous layer 98 may be a porous membrane, metal layer with pores, metal mesh, or a plastic mesh. The porous layer 98 is affixed to the end 50 of the support structure 44 via fasteners 100. Fasteners 100 may include glue or other adhesive. Fasteners 100 may include screws, nails, or bolts made of a metal (e.g., stainless steel) or plastic. In certain embodiments, the porous layer 98 may be directly printed (e.g., via 3D printing) on the end 50. In certain embodiments, as depicted with the dispensing head 90 in FIG. 8F, a porous layer 102 may be affixed to the end 50 of the support structure 44 to hold the wicking structure 54 in place. In addition, the porous layer 102 includes pores or holes 104 for dispensing the PSA solution onto the substrate in a controlled manner with a controlled volume (e.g., similar to needle dispensing) in a desired pattern. The porous layer 102 may be a porous membrane, metal layer with pores, metal mesh, or a plastic mesh. As noted above, in certain embodiments, the end 50 of the dispensing head 14 adjacent the wicking structure 54, a portion of a porous layer adjacent the wicking layer 54 (e.g., arrangement of the pores), and/or the wicking structure 54 is similar in shape to the shape of the printed PSA.

Figure 9:
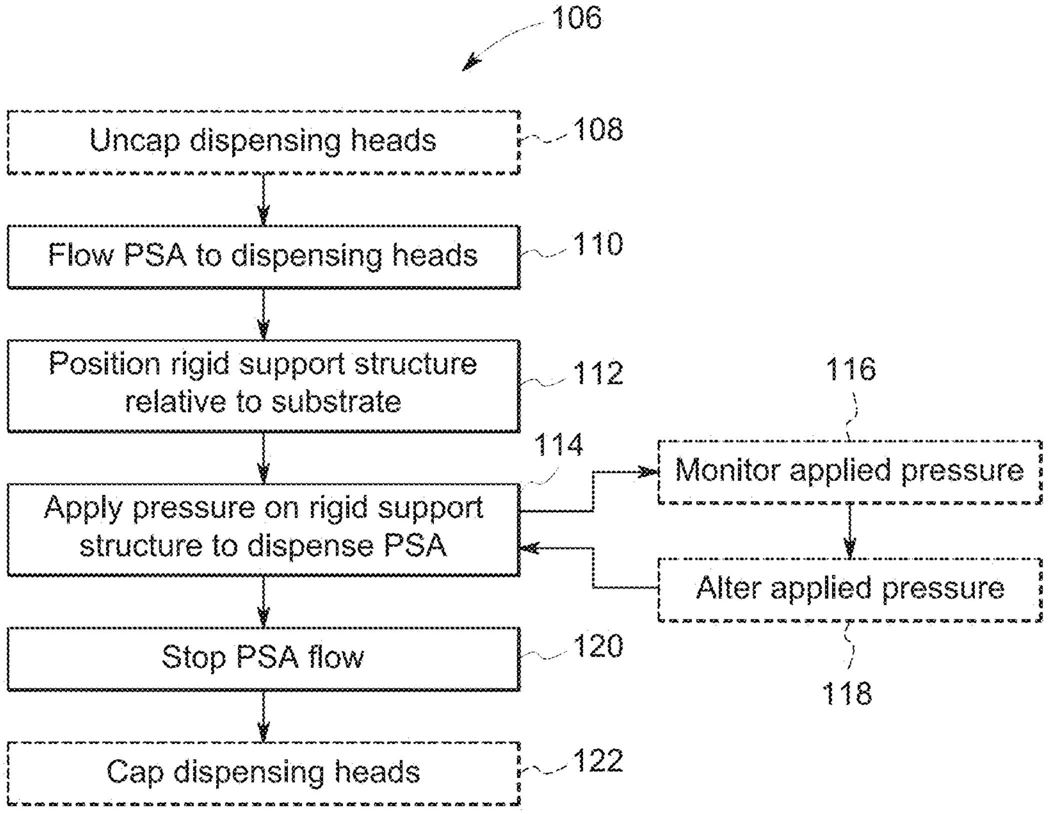
FIG. 9 is a flow chart of a method for printing PSA on a substrate, in accordance with certain aspects of the present disclosure.

FIG. 9 is a flow chart of a method 106 for printing PSA on a substrate. One or more steps of the method 106 may be performed by one or more components of the dispensing system 10 in FIG. 1. One or more steps of the method 106 may be performed simultaneously or in a different order from that shown in FIG. 9. In certain embodiments, the method 106 includes uncapping the dispensing heads (block 108). Uncapping the dispensing heads includes removing caps or covers from the ends of the dispensing heads that directly interface with the substrate during printing. Uncapping may occur when the dispensing heads have not been utilized for a given amount of time and the dispensing heads were capped to avoid solvent evaporation.

The method 106 also includes flowing a PSA solution into the dispensing heads (block 110). For example, PSA solution may be provided via a programmable closed feeding system (as described above in FIG. 1) to the respective feed conduits of each dispensing head (which then flows to the wicking structure).

The method 106 further includes positioning the dispensing tool (e.g., the rigid support structure) relative to the substrate for printing PSA (block 112). The method 106 even further includes, once the dispensing tool is properly positioned, applying pressure on the rigid support structure to dispense or dispose (e.g., via stamping) the PSA solution onto the substrate upon instantaneous contact with the substrate (block 114). The handling/positioning and application of pressure on the dispensing tool may be handled by a robotic handling/positioning system (e.g., robotic handling/positioning system 26 in FIG. 1) coupled to the dispensing tool as described above.

In certain embodiments, the method 106 includes monitoring the applied pressure on the dispensing tool (block 116). The dispensing tool may include one or more pressure sensors disposed within the rigid support structure that provide feedback to a controller as to an amount of pressure applied on the dispensing tool during the stamping operation. The method 106 may also include, when needed, altering the applied pressure on the dispensing tool based on the feedback received from the pressure sensors (block 118). Thus, the monitoring of the applied pressure enables the regulation of the applied pressure.

Upon completing the stamping operation, the method 106 includes stopping the flow of PSA solution to the dispensing heads (block 120). In certain embodiments, when the dispensing heads may not be utilized within a given time, the method 106 includes capping or recapping the dispensing heads with their respective or covers to avoid solvent evaporation (block 122).

Technical effects of the disclosed embodiments include providing a dispensing system that is easily automated via a programmable closed feeding system and a robotic handling/positioning system to enable large scale or high throughput production. In addition, the disclosed dispensing system enables easier cleaning compared to other PSA production techniques. Further, the disclosed dispensing system minimizes solvent evaporation and its associated EHS concerns. The disclosed dispensing system also minimizes material consumption or scrapping. In addition, the disclosed dispensing system reduces production cycle time (e.g., by minimizing introduction of air bubbles into the system. The disclosed dispensing system functions similar to a screen printing system and a needle dispensing system without their associated drawbacks (e.g., cost, maintenance, throughput level, etc.).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for a printing of a pressure sensitive adhesive (PSA) solution on a substrate, comprising:
- a rigid support structure; and
- a plurality of dispensing heads disposed within the rigid support structure and configured to deposit the PSA solution on the substrate in response to applied pressure during the printing of the PSA solution on the substrate, wherein each dispensing head extends from a top surface of the rigid support structure to a bottom surface of the rigid support structure, and wherein each dispensing head of the plurality of dispensing heads comprises:
- a central support structure, wherein the central support structure is hollow; and
- a wicking structure positioned between one or more walls of the rigid support structure and the central support structure, the wicking structure configured to hold the PSA solution, wherein the wicking structure is configured to deposit the PSA solution in a desired shape on the substrate upon contact with the substrate.

2. The system of claim 1, wherein each dispensing head of the plurality of dispensing heads comprises a cap configured to be disposed on a bottom of a respective dispensing head adjacent the wicking structure to keep the PSA solution from drying up.

3. The system of claim 1, comprising a handle coupled to the rigid support structure, wherein the handle is configured to enable movement of the rigid support structure to a desired position for depositing the PSA solution on the substrate.

4. The system of claim 3, comprising a robotic system coupled to the handle and configured to move the rigid support structure to the desired position for depositing the PSA solution on the substrate.

5. The system of claim 1, wherein each dispensing head of the plurality of dispensing heads comprises a feed conduit to receive the PSA solution.

6. The system of claim 5, comprising a closed feeding system coupled to a respective feed conduit of each dispensing head, wherein the closed feeding system is configured to provide the PSA solution to each dispensing head via the respective feed conduit.

7. The system of claim 1, comprising at least one pressure sensor disposed within the rigid support structure and a controller coupled to the at least one pressure sensor, wherein the controller is configured to control an amount of pressure applied by the rigid support structure on the substrate based on feedback from the at least one pressure sensor.

8. The system of claim 1, wherein the wicking structure of each dispensing head comprises a porous membrane or a sponge.

9. The system of claim 1, wherein each dispensing head of the plurality of dispensing heads comprises a porous layer disposed over an end of the central support structure adjacent to the wicking structure to hold the wicking structure in place.

10. A system for a printing of a pressure sensitive adhesive (PSA) solution on a substrate, comprising:

a rigid support structure having a handle;

a robotic system coupled to the rigid support structure via the handle, wherein the robotic system is configured to move the rigid support structure to a desired position for depositing the PSA solution on the substrate and to apply pressure to the rigid support structure for depositing the PSA solution;

a plurality of dispensing heads disposed within the rigid support structure and configured to deposit the PSA solution on the substrate in response to applied pressure during the printing of the PSA solution on the substrate, wherein each dispensing head of the plurality of dispensing heads comprises a feed conduit, wherein each dispensing head includes a central support structure and a wicking structure positioned between one or more walls of the rigid support structure and the central support structure, the central support structure forming a channel through the dispensing head to the wicking structure, and the wicking structure to hold the PSA solution until pressure is applied; and a programmed feeding system coupled to a respective feed conduit of each dispensing head, wherein the programmed feeding system is configured to provide the PSA solution to each respective feed conduit for deposition of the PSA solution.

11. The system of claim 10, wherein the wicking structure is disposed within the central support structure.

12. The system of claim 11, wherein each dispensing head of the plurality of dispensing heads comprises a cap configured to be disposed on a bottom of a respective dispensing head adjacent the wicking structure to keep the PSA solution from drying up.

13. The system of claim 11, wherein the wicking structure of each dispensing head comprises a porous membrane or a sponge.

* * * * *